April 13, 1965     K. E. McAFEE, JR     3,177,897
PRESSURE REDUCING AND DISTRIBUTING VALVE
Filed Sept. 18, 1961
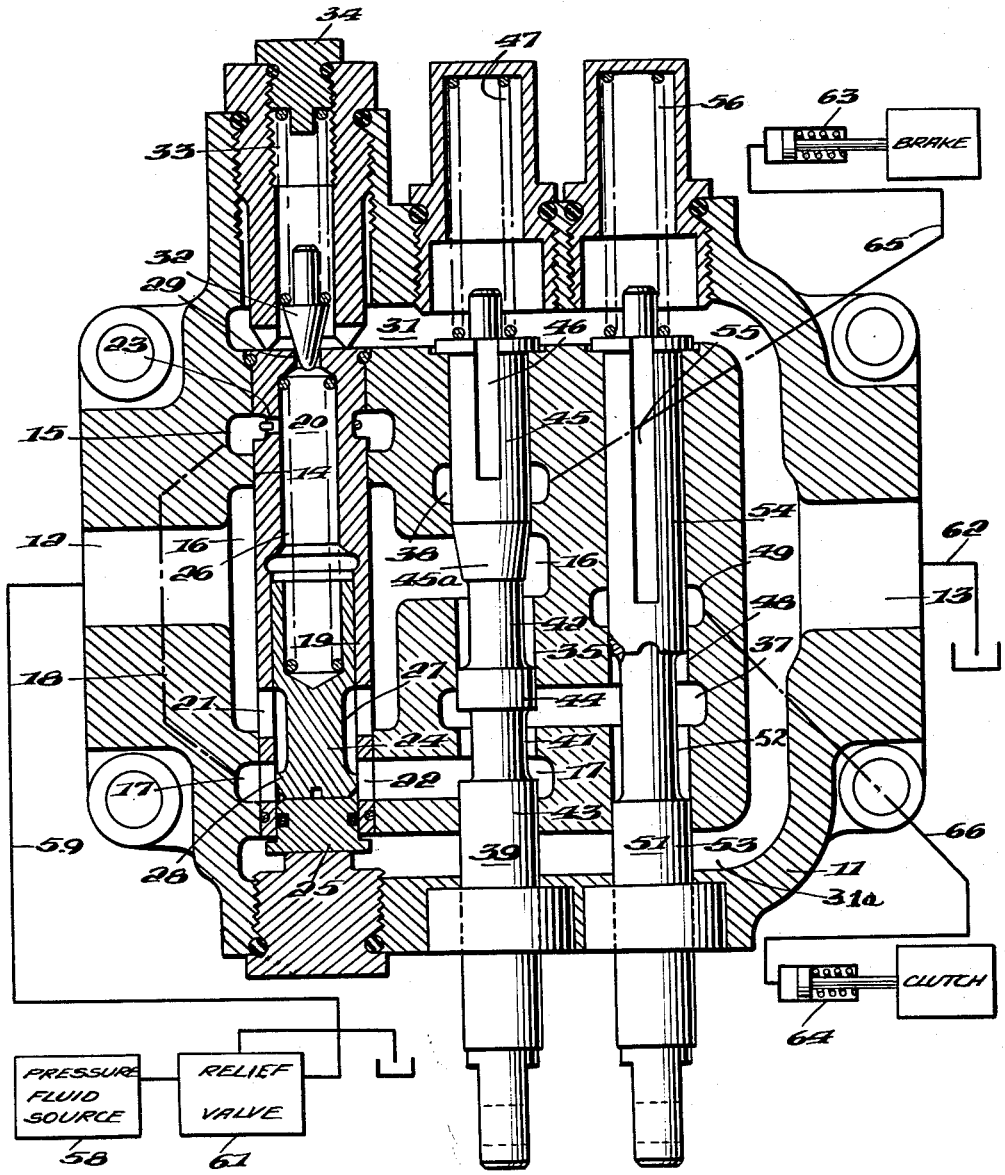
INVENTOR
KYLE E. McAFEE, JR.
BY *Dodge and Sons*
ATTORNEYS ns patent.

United States Patent Office 3,177,897
Patented Apr. 13, 1965

3,177,897
PRESSURE REDUCING AND DISTRIBUTING VALVE
Kyle E. McAfee, Jr., Kalamazoo, Mich., assignor to The New York Air Brake Company, a corporation of New Jersey
Filed Sept. 18, 1961, Ser. No. 138,798
1 Claim. (Cl. 137—612.1)

This invention relates to a pressure reducing valve and to a distributing valve utilizing the same.

In many hydraulic systems the need arises for a distributing valve which will supply one demand with fluid at system pressure and another demand with fluid at a predetermined lower pressure. For example, in a hydraulic system for operating brakes and clutches, it may be desirable to energize the brake operating motor with system pressure and to energize the clutch operating motor with a predetermined lower pressure in order to obtain a desired performance.

The object of the present invention is to provide an improved reducing valve which—among other applications—is particularly suitable for use in the pressure-reducing circuit of such a distributing valve.

The reducing valve includes a housing having a reduced-pressure chamber connected with a source of pressure fluid via a first passage containing a variable restriction. The chamber is connected with an outlet port via a second passage containing restriction means which develop a back-pressure in the chamber. Pressure-responsive means are provided for closing the second passage when the pressure in the chamber is below a predetermined "reduced pressure" value, and means are provided for varying the restriction of said variable restriction directly in accordance with the flow through said second passage. In this manner, the pressure in the chamber is maintained substantially constant regardless of pressure changes resulting from operation of the distributing valve units, fluid leakage, temperature deviations, and the like.

Other objects and advantages of the invention will become apparent from a study of the following specification when considered in conjunction with the accompanying drawing in which the single figure constitutes an axial section of the distribution and pressure reducing valve, the hydraulic system connections of the valve being illustrated schematically.

The valve housing 11 is provided with inlet and outlet ports 12 and 13, respectively, and a pair of motor ports, not shown. A bore 14 in the housing is encircled by a series of chambers 15, 16, and 17 respectively, chamber 16 being in communication with inlet 12. Chamber 17 communicates with chamber 15 through a housing passage as shown schematically by the broken line 18. Sleeve 19 is rigidly mounted in bore 14 and contains two circular series of openings 21 and 22, respectively, and restricted orifice 23 that provide communication between the interior of the sleeve and chambers 16, 17, and 15, respectively. Reducing valve plunger 24 is slidably mounted in the lower end of sleeve 19 and is biased toward threaded plug 25 by spring 26. Annular groove 27 on plunger 24 defines a valve head 28 and affords maximum communication between openings 21 and 22 when head 28 abuts plug 25 as shown. At its upper end, sleeve 19 is provided with a transverse wall containing valve seat opening 29 which affords communication between sleeve chamber 20 and outlet port 13 via manifold 31. Tapered poppet valve 32 is biased downward upon seat 29 by spring 33, the upper end of which seats against threaded plug 34.

The housing 11 also contains a second bore 35 encircled by portions of chambers 16 and 17 and by intermediate chamber 37 and motor chamber 38. Motor chamber 38 communicates with one of the housing motor ports by an internal passage, not shown. Plunger 39 is slidably mounted in bore 35 and is provided with grooves 41 and 42 that define lands 43, 44, and 45, said land 45 having a tapered portion 45a. Slot 46 provided in the outer periphery of the upper end of land 45 affords communication between chamber 38 and manifold 31 when plunger 39 is in the illustrated closed position. Upward movement of plunger 39 in its bore is opposed by biasing spring 47.

A third bore 48 is also provided in the housing and is encircled by a portion of intermediate chamber 37 and by motor chamber 49 which communicates with the other housing motor port via an internal passage, not shown. Plunger 51 is slidably mounted in bore 48 and is provided with groove 52 which defines lands 53 and 54. Slot 55 provided in the upper end of land 54 affords communication between motor chamber 49 and manifold 31 when plunger 51 is in the illustrated closed position. Upward movement of plunger 39 in its bore is opposed by biasing spring 56. Manifold portion 31a serves to conduct leakage fluid from bores 14, 35, and 48 to outlet port 13.

During use, inlet port 12 is connected with a source of pressure fluid 58 (such as a pump) by a conduit 59 containing system pressure relief valve 61. Outlet port 13 is connected with sump via conduit 62. The motor chambers 38 and 48 are connected, through their associated motor ports, with the brake and clutch actuating piston motors 63 and 64, respectively, as illustrated schematically by the broken lines 65 and 66. As will be apparent from the following discussion, the setting of relief valve 61 determines the operating pressure of brake motor 63, and the tension of spring 33 determines the reduced operating pressure of clutch motor 64.

Operation

Assuming that pump 58 is running and that plungers 39 and 51 are in their illustrated neutral positions, the pressure in chamber 16 quickly increases until relief valve 61 opens, whereupon chamber 16 is charged with fluid having a pressure equal to the relief setting. Assuming that spring 33 establishes a reduced pressure value which is lower than the setting of relief valve 61, poppet 32 opens to connect chamber 16 with sump via openings 21, groove 27, openings 22, conduit 18, chamber 15, restricted orifice 23, chamber 20, seat 29, passage 31, port 13 and conduit 62. As the fluid begins to flow through restricted orifice 23, an increasing pressure differential is established between chambers 17 and 20 which causes plunger 24 to be raised against the biasing force of spring 26. However, as plunger 24 moves upward the flow through openings 22 is progressively restricted with the result that the rate of increase of the pressure differential is progressively reduced. The reducing valve quickly obtains an equilibrium condition in which poppet 32 is open and plunger 24 is in a metering position establishing a pressure differential between chambers 17 and 20 which balances the force of spring 26. The back pressure in chamber 17 now equals the predetermined reduced pressure value.

Assuming now that it is desired to pressurize the brake operating piston motor 63, plunger 39 is shifted upward against the biasing force of spring 47 to isolate chamber 37 by land 43, to interrupt the venting passage through groove 46, and to connect chamber 16 with motor 63 via groove 42, chamber 38, and conduit 65. Assuming that the demand created by the energization of motor 63 causes the pressure in chamber 16 to decrease below the relief pressure setting, relief valve 61 closes. Poppet 32 may or may not be closed at this time, depending on whether or not the pressure in chamber 20 decreases below the reference pressure established by spring 33. Assuming that poppet 32 remains open during the energization of motor 63, the flow through the reducing valve is decreased as fluid is supplied from chamber 16 to motor 63 during energization of the brake, and consequently the back pressure in chamber 17 decreases correspondingly. Since the force of spring 26 exceeds the pressure differential, plunger 24 is moved downward (to increase the flow through the reducing valve and to thereby increase the pressure differential), until the plunger reaches a position in which the pressure differential balances the force of spring 26 and the back pressure in chamber 17 equals the predetermined reduced pressure. It is apparent that the reducing valve continuously operates to maintain the reduced pressure value in chamber 17 during operation of the distributing valve. Upon the completion of the energization of motor 63, the pressure in chamber 16 increases to the relief pressure setting and valve 61 opens. Since motor 63 no longer demands fluid from chamber 16, the flow through the reducing valve increases, and owing to the corresponding increase in pressure differential, plunger 24 is moved upward to a position of equilibrium in which the pressure differential balances the force of spring 26 and the back pressure in chamber 17 equals the predetermined reduced pressure value.

It will be noted that intermediate chamber 37 is isolated when plunger 39 is raised to the brake operating position, and consequently plunger 39 must be returned to the illustrated neutral position before the clutch operating motor 64 can be energized. As a result of this safety feature, simultaneous operation of the brake and clutch mechanisms and resulting damage to the differential of an associated transmission system are avoided. Thus assuming that it is desired to operate the clutch, plunger 39 is released and is returned to the neutral position by spring 47, whereupon chamber 38 is again isolated from supply chamber 16, brake operating motor 63 is de-energized through venting slot 46, and chambers 17 and 37 are interconnected via groove 41. Plunger 51 is now raised against the biasing force of spring 56 to interrupt the venting of chamber 49 through slot 55 and to connect chamber 17 with motor 64 via groove 41, chamber 37, groove 52, chamber 49, and conduit 66. Owing to the decrease of pressure in chamber 17 which occurs during energization of motor 64, plunger 24 is moved downward by spring 26 to increase the flow through the reducing valve and thereby increase the back pressure in chamber 17. Plunger 24 will be displaced downward until the pressure differential just balances the force of spring 26, whereupon the back pressure in chamber 17 equals the predetermined reduced pressure value. When the energization of motor 64 is completed, the flow to this motor ceases and the flow through restricted orifice 23 increases. Owing to the corresponding increase in the pressure differential, plunger 24 is moved upward until the pressure differential balances the force of spring 26, at which time the back pressure in chamber 17 equals the predetermined reduced pressure value.

Upon the release of plunger 51, the plunger is returned to the neutral position by spring 56 with the result that motor 64 is de-energized via venting slot 55. The reducing valve again obtains the equilibrium condition as outlined above.

While the preferred embodiment of the invention has been illustrated and described, it will be apparent to those skilled in the art that modifications may be made in the apparatus without deviating from the invention set forth in the following claim.

What is claimed is:

A distributing valve comprising a housing having an inlet port, an outlet port, a chamber, a first passage connecting said chamber with said inlet port, and second passage connecting said chamber with said outlet port; at least two distributing units in said housing, each of said units having supply and delivery connections, said housing also having third and fourth passages connecting said chamber with the supply connection of one of said units and connecting said inlet port with the supply connection of another unit, respectively; variable restriction means controlling the flow of fluid through said first passage; pressure-responsive means closing said second passage when the fluid pressure in said chamber is below a predetermined value; and flow-rate responsive means varying the restriction afforded by said variable restriction means directly in accordance with the rate of fluid flow through said second passage.

References Cited by the Examiner
UNITED STATES PATENTS

| | | | |
|---|---|---|---|
| 2,729,233 | 1/56 | Garmager | 137—596.12 XR |
| 2,881,794 | 4/59 | Baldwin et al. | 137—501 |
| 2,923,306 | 2/60 | Mitchell | 137—491 XR |
| 2,988,106 | 6/61 | Rue | 137—596.12 |
| 2,994,346 | 8/61 | Ruhl | 137—621 |
| 3,019,816 | 2/62 | Larsen et al. | 137—621 |
| 3,024,803 | 3/62 | Beremand | 137—501 |

M. CARY NELSON, *Primary Examiner.*
KARL J. ALBRECHT, *Examiner.*